United States Patent
Baldwin et al.

(10) Patent No.: US 9,690,573 B2
(45) Date of Patent: *Jun. 27, 2017

(54) WEB CONTENT MANAGEMENT USING PREDETERMINED PROJECT TEMPLATES

(71) Applicant: International Business Machines Corporation, Armonk, NY (US)

(72) Inventors: Nicholas A. Baldwin, Gladesville (AU); Mark C. Hampton, Carlton (AU); Stefan A. Hepper, San Jose, CA (US); Eric M. de Morentin, Manly (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/460,388

(22) Filed: Aug. 15, 2014

(65) Prior Publication Data

US 2015/0007127 A1  Jan. 1, 2015

Related U.S. Application Data

(63) Continuation of application No. 13/930,999, filed on Jun. 28, 2013.

(51) Int. Cl.
*G06F 17/30* (2006.01)
*G06F 9/44* (2006.01)

(52) U.S. Cl.
CPC ............ *G06F 8/70* (2013.01); *G06F 17/3089* (2013.01)

(58) Field of Classification Search
None
See application file for complete search history.

(56) References Cited

U.S. PATENT DOCUMENTS

| 6,185,587 B1 * | 2/2001 | Bernardo | G06F 17/211 707/E17.112 |
| 6,219,680 B1 * | 4/2001 | Bernardo | G06F 17/211 707/E17.112 |

(Continued)

FOREIGN PATENT DOCUMENTS

| CN | 1726509 A | 1/2006 |
| CN | 101297310 A | 10/2008 |

(Continued)

OTHER PUBLICATIONS

U.S. Appl. No. 13/930,999, entitled "Web Content Management Using Predetermined Project Templates", filed Jun. 28, 2013.

*Primary Examiner* — Isaac T Tecklu
(74) *Attorney, Agent, or Firm* — David B. Woycechowsky (57) ABSTRACT

Embodiments of the present invention provide a system, method, and program product. In an embodiment, a computing device generates a list of predetermined project templates associated with a web page, wherein the web page is new or preexisting. The computing device transmits the generated list of predetermined project templates for display that includes one or more predetermined project templates that include a preset package of web content editing actions that are associated with the web page. The computing device generates a web page action associated with the web page according to a project generated using a predetermined project template included in the transmitted list of predetermined project templates. The computing device transmits the generated web page action for display.

3 Claims, 4 Drawing Sheets

(56) References Cited

U.S. PATENT DOCUMENTS

| | | | | |
|---|---|---|---|---|
| 6,247,032 B1* | 6/2001 | Bernardo | | G06F 17/211 707/E17.112 |
| 6,308,188 B1* | 10/2001 | Bernardo | | G06F 17/211 707/E17.112 |
| 6,684,369 B1* | 1/2004 | Bernardo | | G06F 17/211 707/E17.116 |
| 6,938,205 B1* | 8/2005 | Hanson | | G06F 17/2247 715/234 |
| 7,155,491 B1* | 12/2006 | Schultz | | G06F 17/30887 707/E17.115 |
| 8,250,455 B2 | 8/2012 | Kadowaki et al. | | |
| 2002/0073125 A1* | 6/2002 | Bier | | G06F 17/24 715/255 |
| 2002/0099845 A1* | 7/2002 | Passanisi | | G06F 8/60 709/236 |
| 2002/0116413 A1* | 8/2002 | Clark | | G06F 17/243 715/234 |
| 2002/0147517 A1* | 10/2002 | Messler | | G06F 17/30873 700/97 |
| 2002/0161603 A1* | 10/2002 | Gonzales | | G06Q 10/10 709/205 |
| 2002/0184359 A1* | 12/2002 | Kaneko | | G06Q 30/0283 709/223 |
| 2004/0010772 A1* | 1/2004 | McKenna | | G06Q 10/06 717/101 |
| 2004/0205572 A1* | 10/2004 | Fields | | G06F 17/3089 715/234 |
| 2006/0020681 A1* | 1/2006 | DePree et al. | | 709/217 |
| 2007/0143398 A1* | 6/2007 | Graham | | 709/204 |
| 2007/0162842 A1* | 7/2007 | Ambachtsheer et al. | | 715/513 |
| 2007/0162845 A1* | 7/2007 | Cave et al. | | 715/530 |
| 2007/0162846 A1* | 7/2007 | Cave et al. | | 715/530 |
| 2008/0052146 A1* | 2/2008 | Messinger | | G06Q 10/06 705/7.23 |
| 2008/0155518 A1* | 6/2008 | Van Wyk et al. | | 717/142 |
| 2008/0172608 A1* | 7/2008 | Patrawala | | H04L 67/02 715/255 |
| 2008/0229391 A1* | 9/2008 | Bimson et al. | | 726/3 |
| 2009/0155757 A1* | 6/2009 | Gradisar | | G09B 5/00 434/350 |
| 2009/0249195 A1* | 10/2009 | Angell | | G06F 17/24 715/243 |
| 2010/0095197 A1* | 4/2010 | Klevenz | | G06F 17/2247 715/234 |
| 2011/0161847 A1* | 6/2011 | Chaikin | | G06F 17/3089 715/763 |
| 2011/0208812 A1* | 8/2011 | Bimson et al. | | 709/203 |
| 2014/0046980 A1* | 2/2014 | Kleinschmidt | | G06F 17/30896 707/793 |
| 2014/0201615 A1* | 7/2014 | Rajkumar | | G06F 17/30011 715/234 |

FOREIGN PATENT DOCUMENTS

| | | |
|---|---|---|
| CN | 104252521 A | 12/2014 |
| WO | 2004049220 A2 | 6/2004 |

* cited by examiner

WEB CONTENT MANAGEMENT USING PREDETERMINED PROJECT TEMPLATES

BACKGROUND

The present invention relates generally to the field of web content management, and more particularly to web content management using predetermined project templates. A web content management system (hereinafter "WCMS") is software that is used to create, modify, and publish content for a website. In a WCMS, the layout and design elements of a website are managed separately from its content. This allows a user to change the layout and design of a web page without changing the content, and change the content without having to update the layout and design. A website may consist of one or more web pages. A website that consists of multiple web pages has a hierarchy wherein a web page at a higher level in the web hierarchy is referred to as a parent web page and web pages that are linked below it are child web pages.

In a WCMS, the design and layout of a website are separated from its displayed content, which allow content to be created for a website without having to understand how to build a website. When a new web page with new content is being created or modified the changes are typically done as drafts and grouped via a container, usually called workspace or project. Projects allow a user to change a set of web content items on a web page or website, have them reviewed and previewed together and ensure that they are published together at the same time. Currently, when a user creates a new project they need to set a number of related properties associated with the project, such as the list of approvers, the actions to be executed, and how the project is going to be published. In order to avoid entering these properties for each new project they can be pre-set in a project template that then can be used to create a new project with the pre-set properties filled in from the project template.

Larger websites can have many different project templates, because each part of the website contains web content items that require different review processes and different sets of approvers. Hence, for large websites, there could potentially be many projects templates that an author has to navigate through (and potentially review) in order to select the correct one for the type of changes and the area of the website being modified.

SUMMARY

Embodiments of the present invention provide a system, method, and program product. In an embodiment, a computing device generates a list of predetermined project templates associated with a web page, wherein the web page is new or preexisting. The computing device transmits the generated list of predetermined project templates for display that includes one or more predetermined project templates that include a preset package of web content editing actions that are associated with the web page. The computing device generates a web page action associated with the web page according to a project generated using a predetermined project template included in the transmitted list of predetermined project templates. The computing device transmits the generated web page action for display.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
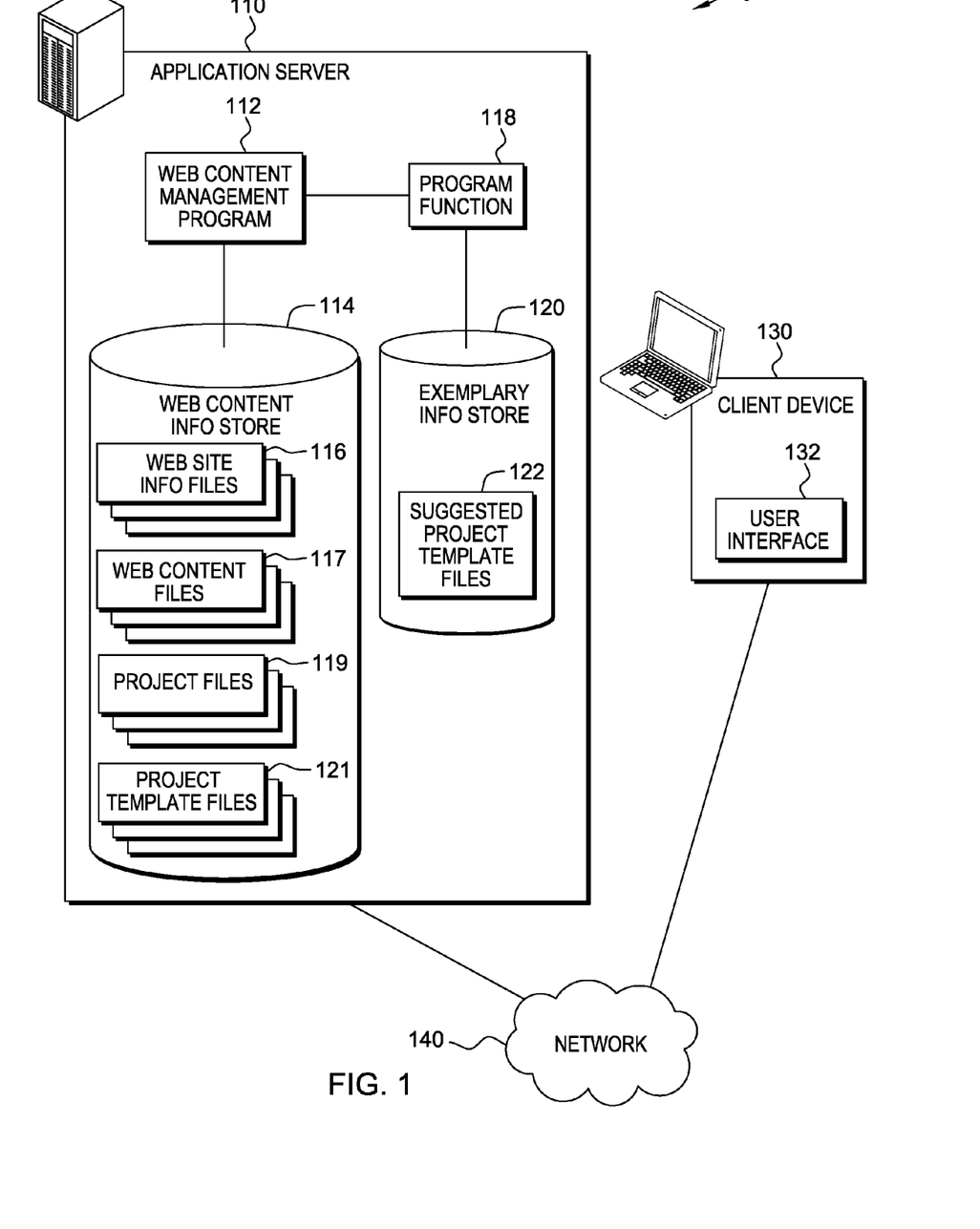
FIG. 1 is a block diagram illustrating an environment, in accordance with an embodiment of the present invention.

Embodiments of the present invention will now be described in detail with reference to the Figures. FIG. 1 is a block diagram illustrating an environment, generally designated 100, in accordance with an embodiment of the present invention.

Environment 100 includes client device 130 and application server 110, all interconnected over network 140. Network 140 can be, for example, a local area network (LAN), a wide area network (WAN) such as the Internet, or a combination of the two, and can include wired, wireless, or fiber optic connections. In general, network 140 can be any combination of connections and protocols that will support communications between client device 130 and application server 110, in accordance with an embodiment of the present invention.

In various embodiments of the present invention, client device 130 and application server 110 may be a laptop computer, tablet computer, netbook computer, personal computer (PC), a desktop computer, a personal digital assistant (PDA), and a smart phone. Client device 130 is a computing device that accesses a web content management service made available by a server. Client device 130 includes user interface 132, which is used by a user to access and manipulate web content management system 112 (discussed below in further detail). User interface 132 typically is a graphical user interface (GUI) that is displayed on a display, such as display 520.

User interface 132 may also include navigation menus and other graphical elements that a user may utilize, via, for example, a keyboard, keypad, a touch screen, audio and/or some other suitable input device. User interface 132 may be a textual user interface. In general, user interface 132 may be any user interface, for example, a mouse, keyboard, speech/sound based, or touch-screen display, that allows a user to generate signals sufficient to access and manipulate web content management program (hereinafter "WCMP") 112. Application server 110 is a computing device that provides web content management services to client computing devices, in accordance with an embodiment of the present invention. Application server 110 includes web content information store 114, WCMP 112, exemplary information store 120, and program function 118.

Web content information store 114 is in communication with WCMP 112, in accordance with an embodiment of the present invention. Web content information store 114 is an information repository that includes website information 116, web content files 117, project template files 121, and project files 119, in accordance with an embodiment of the present invention. A website is a collection of related web pages served from a single web domain that is hosted on at least one web server, for example, application server 110, accessible via a network such as the Internet or a private local area network through an Internet address known as a Uniform Resource Locator. A web page is a document, typically written in plain text interspersed with formatting instructions of a markup language, for example, the Hypertext Markup Language. A web page can include more than one area, for example, header, content, footer, left panel, and right panel.

Website information files 116 include web pages generated, managed, and/or published by WCMP 112 and metadata associated therewith. Web page management includes a modifying and/or editing act performed on a web page. In an embodiment, website information files 116 include metadata reflective of one or more of a description, keyword, creation date, author, and version information. A website may consist of one or more web pages. A website that consists of multiple web pages has a hierarchy wherein a web page at a higher level in the web hierarchy is referred to as a parent web page and web pages that are linked below it are child web pages. Web content files 117 are files that include web content, for example, text, embedded graphics, photos, video, audio, navigational components, and code (e.g., for applications) that displays web content or interacts with the user of the web page. Project template files 121 are projects generated by program function 118 via a content management system, for example, WCMP 112.

In an embodiment, project template files 121 are data structures used by a web content management system to generate a project, in accordance with an embodiment of the present invention. When a new web page with new content is being created or modified the changes are typically done as drafts and grouped via a container (hereinafter "project"). Projects allow a set of web content items on a web page or website to be modified, reviewed and previewed together and ensure that they are published together at the same time. Project template files 121 are files that include edits used by WCMP 112 to generate a project. Projects, created from project templates 121, allow web content associated with a web page to be generated, modified, and/or published according to predetermined criteria, wherein all web content editing actions associated with a web page or a portion thereof are grouped together into one data structure so that they are published at the same time. For example, a web page or web content is published when it is reflected in a live website made available on the Internet or a Intranet Project template files 121 may either be created de novo or based on another project included in project files 119 (discussed below). In an embodiment, project template files 121 are specified by a data structure, such as a Java© data object, or a template language, such as PHP and ASP.NET.

Project templates files 121 are associated with an entire website included in website information files 116 and/or a specific part thereof, for example, a template child page for creating product pages or news pages. A web site that consists of multiple web pages has a hierarchy wherein the web page at a higher level in the web hierarchy is referred to as a parent web page and the web pages that are linked below it are child web pages.

Project files 119 are data structures used by a web content management system to generate or edit a new or pre-existing web page or web content item. Project files 119 include information used by WCMP 112 to generate and/or edit a new or pre-existing web page or web content item. Project files 119 also include information used by WCMP 112 to publish a web page, for example, a web page included in web site information 116. In an embodiment, project files 119 are files that include a preset package of web content editing actions used by WCMP 112 to generate, modify, and/or publish a web page included in website information files 116. In yet another embodiment, project files 119 are files that include a preset package of web content editing actions used by WCMP 112 to generate, modify, and/or publish a web content item included in web content files 117.

In another embodiment, information included in project files 119 and/or web content files 117 are included in a database in communication with WCMP 112. Project files 119 facilitate the management of web content items, for example, web content files 117, associated with a new or preexisting web page included in, for example, website information files 116. For example, web content files 117 include text and embedded graphics, photos, video, audio, and code (e.g., for applications) that displays web content items or interacts with the user. In another embodiment, the project files 119 define information necessary for WCMP 112 to generate, manage, and/or publish a web page and/or web content item and includes, for example, the required approvers, actions to be executed, and publishing option. Project files 119 list the web content items and/or workflows associated with the project. In an embodiment, project files 119 define an approval process that is required before the defined web content editing actions are reflected in a live website made available on the Internet (i.e., published).

WCMP 112 is in communication with web content information store 114 and program function 118, in accordance with an embodiment of the present invention. WCMP 112 is content management software utilized to generate, manage, and/or publish web pages and/or websites without requiring that a web content author have knowledge of a programming language or markup language, such as the Hyper Text Markup Language. WCMP 112 generates, manages, and/or publishes web pages utilizing information that includes one or more of website information files 116, web content information files 117, project template files 121, and suggested project template file 122. In an embodiment, web pages generated by WCMP 112 include metadata that define suggested project templates included in, for example, project template files 121.

Exemplary information store 120 is an information repository that includes suggested project template files 122, which are data structures that list predefined project templates that are included in project template files 121 and the web pages included in website information files 116 that are associated therewith. In general, exemplary information store 120 can be any information repository capable of storing information, in accordance with an embodiment of the present invention.

Program function 118 is in communication with WCMP 112 and exemplary information store 120, in accordance with an embodiment of the present invention. Program function 118 is software that generates predetermined project templates that are associated with a web page, website, or a portion thereof. Program function 118 utilizes suggested project template information file 122 to generate a predetermined project template list associated with projects included in projects files 119. Program function 118 can instruct WCMP 112 to transmit, via network 140, a list of predetermined project template list for display, for example, by client device 130. Program function 118 can, via WCMP 112, generate project template files 121.

Figure 2:
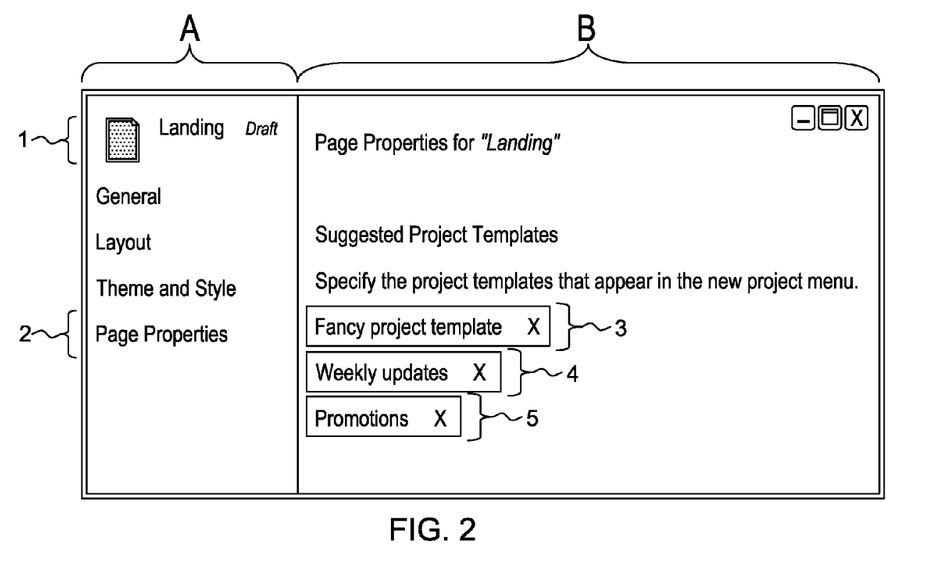
FIG. 2 is a screenshot generated by the program function of FIG. 1, in accordance with an embodiment of the present invention.
Figure 3:
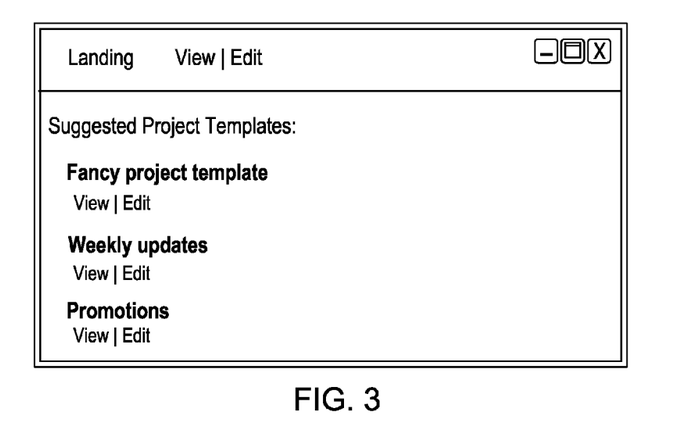
FIG. 3 is an additional screenshot generated by the program function of FIG. 1, in accordance with an embodiment of the present invention.
Figure 4:
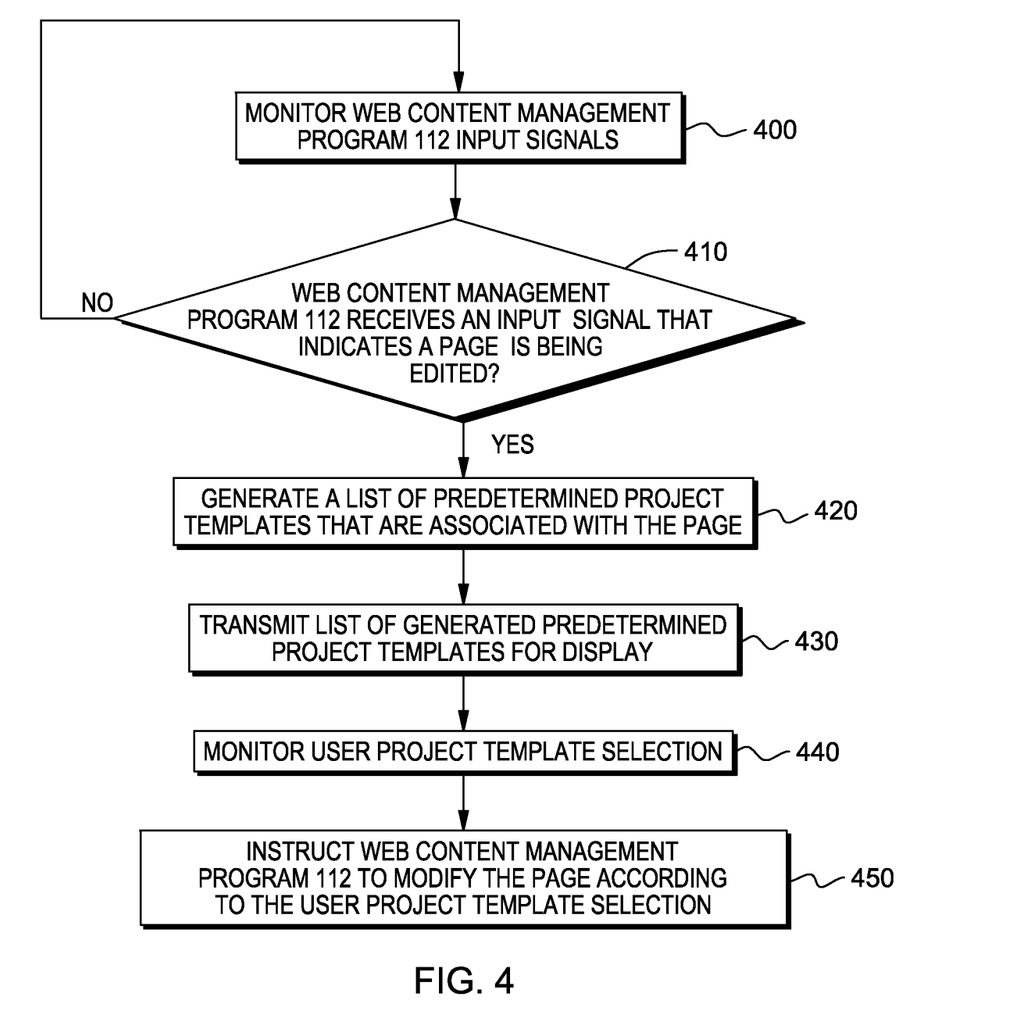
FIG. 4 is a flowchart depicting operational steps of the program function of FIG. 1 for generating project template suggestions, in accordance with an embodiment of the present invention.

Concepts introduces in FIGS. 2 and 3 with be used further in the discussion of FIG. 4. FIG. 2 is a screenshot generated by program function 118, in accordance with an embodiment of the present invention. Specifically, FIG. 2 depicts properties associated with the web page, Landing, depicted in field 1. For example, Landing, a web page included in website information files 116, is generated by WCMP 112 using information included in website information files 116, web content files 117, project files 119, project template files 121, and/or suggested project template files 122. FIG. 2 is generated by program function 118 and includes windows A and B. In an embodiment, program function 118 generates FIG. 2 in response to determining that Landing is being generated and/or edited via WCMP 112.

Window A lists definable properties associated with Landing, such as General, Layout, Theme and Style, and Page Properties. Program function 118 generates Window B in response to receiving a signal input, for example, a mouse click, associated with field 2, Page Properties. Window B allows a user to define which predetermined project templates included in project template files 121 are associated with the web page identified in field 1 of Window A, Landing. Suggested project templates listed in Window B, Fancy project template, Weekly updates, and Promotions are projects templates included in project template files 121.

FIG. 3 is an additional screenshot generated by program function 118, in accordance with an embodiment of the present invention. For example, program function 118 generates FIG. 3 upon receiving an input signal, for example, a mouse click, that indicates that a user desires to edit Landing. FIG. 3 depicts a window generated by program function 118 that includes a header and body. The header includes pageID and menu options. The body lists the suggested project templates associated with Landing as defined in FIG. 2. For example, program function 118 generates the window depicted in FIG. 3 by accessing suggested project template file 120 and determining the project templates that are associated with Landing.

FIG. 4 is a flowchart depicting operational steps of program function 114 for generating project template suggestions, in accordance with an embodiment of the present invention. Program function 118 monitors web content management program 112 input signals (step 400). For example, program function 118 monitors input signals generated by user interface 132 that are associated with WCMP 112. Program function 118 determines whether WCMP 112 received an input signal that indicates a page is being edited (decisional 410). For example, program function 118 accesses WCMP 112 and determines that a web page included in website information files 116 is undergoing a web content editing action, for example, the web page is being created or modified.

If program function 118 determines that WCMP 112 received an input signal that indicates a web page is not being edited ("no" branch decisional 410), program function 118 returns to step 400. If program function 118 determines that WCMP 112 received an input signal that indicates a page is being edited ("yes" branch decisional 410), program function 118 generates a list of predetermined project templates that are associated with the page (step 420). For example, program function 118 accesses suggested project template file 122, which lists predetermined project templates and their associated web pages, and generates the list of predetermined project templates associated with the page by determining which predetermined project templates included in the list are associated with the page.

In an embodiment, if program function 118 determines that suggested project template file 122 does not include predetermined project template for the web page, then program function 118 generates a list of predetermined project templates that are associated with a parent page of the web page. A website that consists of multiple web pages has a hierarchy wherein the web page at a higher level in the web hierarchy is referred to as a parent web page and the web pages that are linked below it are child web pages. Program function 118 transmits the generated list of predetermined project templates for display (step 430). For example, program function 118, via network 140, transmits the generated list of predetermined project templates for display on client device 130.

Subsequent to receiving the transmitted list of predetermined project template, the user of client device 130 decides which predetermined project template to use, if any. Program function 118 monitors user project template selection (step 440). For example, program function 118 monitors user project template selection by monitoring a signal input generated via user interface 132 that is associated with a predetermined project template included in the transmitted list of predetermined project templates generated by program function 118. Subsequently, program function 118 instructs WCMP 112 to edit the web page according to the user project template selection (step 450). In an embodiment, in response to receiving a signal input generated via user interface 132 that is associated with a predetermined project template included in the transmitted list of predetermined project templates, program function 118 generates a project for each selected predetermined project template and generates web content editing actions that include generating, modifying, and/or publishing web pages and/or web content items.

Figure 5:
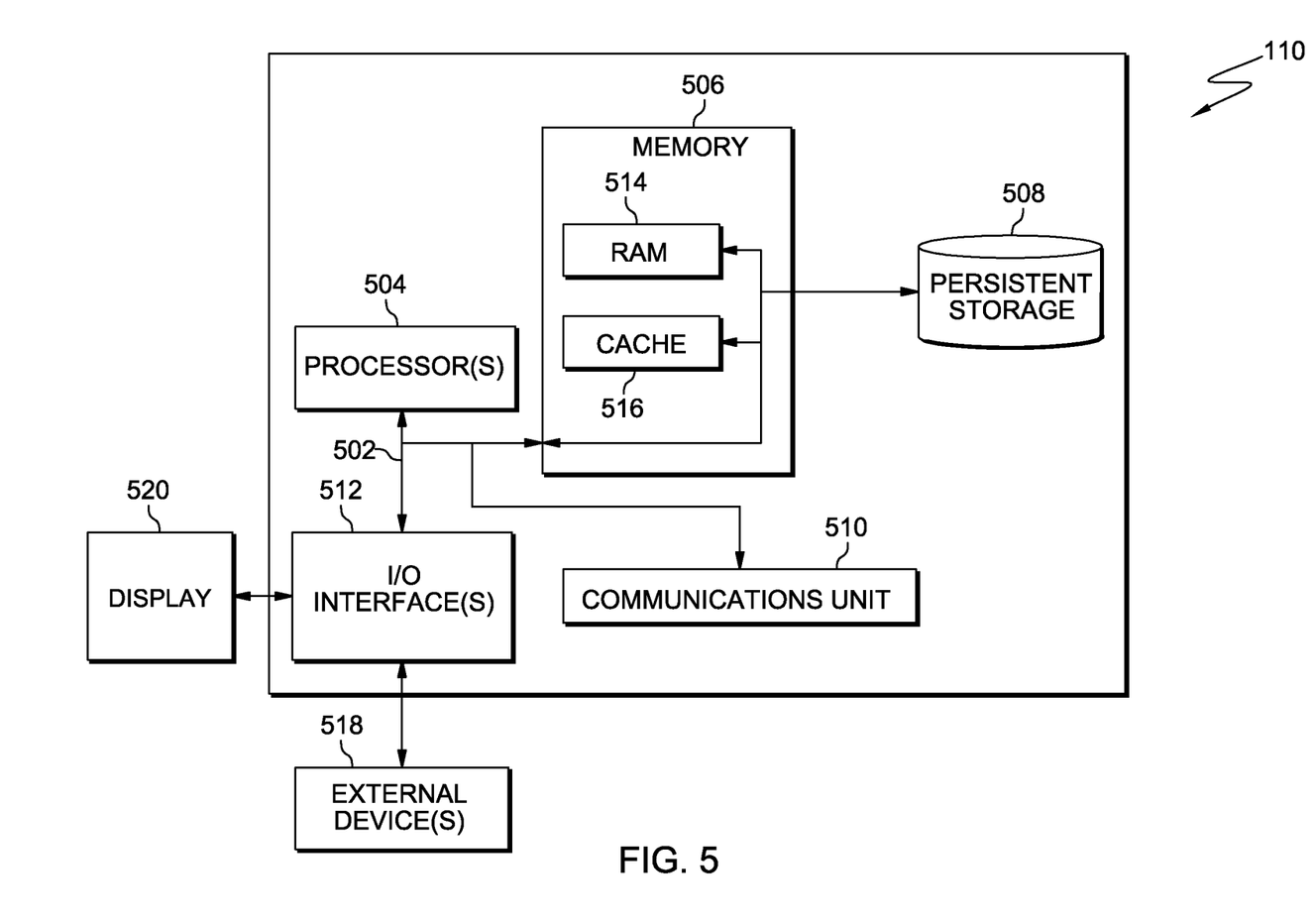
FIG. 5 depicts a block diagram of components of the application server of FIG. 1, in accordance with an embodiment of the present invention.

FIG. 5 depicts a block diagram of components of application server 110 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Application server 110 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Program function 118, WCMP 112, web content information store 114 and exemplary information store 120 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including client device 130. In these examples, communications unit 510 includes one or more network interface cards. Communications unit 510 may provide communications through the use of either or both physical and wireless communications links. Program function 118 and WCMP 112 may be downloaded to persistent storage 508 through communications unit 510.

I/O interface(s) 512 allows for input and output of data with other devices that may be connected to application server 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., program function 118, WCMP 112, web content information store 114, and exemplary information store 120, can be stored on such portable computer-readable storage media and can be loaded onto persistent storage 508 via I/O interface(s) 512. I/O interface(s) 512 also connects to a display 520. Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   creating a first web page data set corresponding to a first parent web page, with the first parent web page data set including metadata indicative of a list of suggested web page templates that can be used to create child web page(s) that are hierarchically related to the first parent web page in a parent-child relationship;
   accessing the metadata of the first web page data set to communicate, to a user, the list of suggested web page templates;
   receiving, from the user, user input indicating a selection of a first suggested web page template from the list of suggested web page templates;
   monitoring the receipt of the user input indicating the selection of the first suggested web page template by monitoring a signal input generated via a user interface, which signal input is indicative of the first suggested web page template;
   editing, by the user and under control of a web-content management program a first child web page according to rules of the first suggested web page template; and
   hierarchically relating the first parent web page to the first child web page in a parent-child relationship.

2. The method of claim 1, wherein the use, of the first suggested web page template includes: editing the first child web page in a manner controlled by the first suggested web page template.

3. The method of claim 1, wherein the use of the first suggested web page template includes:
   editing the first child web page in a manner controlled by the first suggested web page template.

* * * * *